(12) United States Patent
Gilham et al.

(10) Patent No.: US 7,206,585 B2
(45) Date of Patent: Apr. 17, 2007

(54) LOCATION-DEPENDENT DATA COLLECTION

(75) Inventors: Christopher John Gilham, Winchester (GB); Simon John Atkinson, Romsey (GB)

(73) Assignee: Roke Manor Research Ltd., Romsey (GB)

(*) Notice: Subject to any disclaimer, the term of this patent is extended or adjusted under 35 U.S.C. 154(b) by 340 days.

(21) Appl. No.: 10/003,723

(22) Filed: Dec. 6, 2001

(65) Prior Publication Data

US 2002/0086681 A1 Jul. 4, 2002

(30) Foreign Application Priority Data

Dec. 6, 2000 (GB) ................................ 0029656.6
Aug. 13, 2001 (GB) ................................ 0119566.8

(51) Int. Cl.
*H04Q 7/20* (2006.01)
(52) U.S. Cl. .................. 455/450; 455/456; 715/746; 340/995.1
(58) Field of Classification Search ............ 455/456.1, 455/403, 404.2, 412.1, 414.2, 414.3, 433, 455/569.2, 575.9, 426.1, 426.2, 456, 450; 340/539.26, 870.11, 436, 531, 995.1; 345/810; 715/746

See application file for complete search history.

(56) References Cited

U.S. PATENT DOCUMENTS

| 5,128,981 A * | 7/1992 | Tsukamoto et al. ......... 455/450 |
| 5,748,104 A | 5/1998 | Phillips |
| 6,014,089 A | 1/2000 | Hinze et al. |
| 6,031,455 A | 2/2000 | Grube et al. |
| 6,150,961 A * | 11/2000 | Alewine et al. ......... 340/995.1 |
| 6,760,046 B2 * | 7/2004 | I'Anson et al. ............ 715/746 |
| 2001/0018344 A1 | 8/2001 | Tervo et al. |
| 2002/0054150 A1 * | 5/2002 | I'Anson et al. ............. 345/810 |
| 2002/0086681 A1 * | 7/2002 | Gilham et al. .............. 455/456 |

FOREIGN PATENT DOCUMENTS

| EP | 0 715 285 A | 6/1996 |
| EP | 0 763 807 A | 3/1997 |
| EP | 0 892 381 A | 1/1999 |
| EP | 0921509 | 6/1999 |
| EP | 1081666 | 3/2001 |
| EP | 1213905 A2 * | 11/2005 |
| EP | 1 122 702 B1 | 3/2006 |
| GB | 230173 | 9/2001 |
| GB | 26369966 | * 12/2005 |
| JP | 2000-286989 | 10/2000 |
| WO | 94/09464 | 4/1994 |
| WO | 99/13426 | 3/1999 |
| WO | 99/24952 | 5/1999 |
| WO | 00/65996 | 11/2000 |
| WO | 01/16854 | 3/2001 |
| WO | 02/03350 | 1/2002 |

OTHER PUBLICATIONS

European Office Action dated Aug. 7, 2006 (Five(5) pages).

* cited by examiner

*Primary Examiner*—William D. Cumming
(74) *Attorney, Agent, or Firm*—Crowell & Moring LLP

(57) ABSTRACT

A method is described for collecting location-dependent data in a central data collection point. The method comprises the steps of: collecting location dependent data from a data source, in a nearby portable communications device; transmitting the collected data to a base station of the portable communications device; and communicating the collected data along with a location identifier to the data collection point.

16 Claims, 5 Drawing Sheets

LOCATION-DEPENDENT DATA COLLECTION

BACKGROUND OF THE INVENTION

In certain areas of the world, such as many countries of Europe, mobile telephones have become very popular. Large numbers of mobile telephones are carried by people in all walks of life as they go about their daily business. For the vast majority of the time, these telephones are either turned off completely, or are in standby mode, that is, they are powered and registered with a base station but are not actively communicating.

Many applications exist in which location-dependent data needs to be collected. Examples of such applications are weather monitoring, meter reading, evaluation of traffic conditions. Each of these applications will be described in greater detail below, but each requires a large amount of data to be collected from geographically dispersed sites. It would be expensive to install and maintain a dedicated communications system for collecting the required data from each of these various sources.

SUMMARY OF THE INVENTION

The present invention provides a method of collecting location dependent data from geographically dispersed sites without the need for a dedicated communications network. In particular, the invention allows portable communications devices such as mobile telephones to collect data relevant to the area in which they happen to be, and to transmit that data over their assigned communications channels to a central data collection point.

Accordingly, the present invention provides a method for collecting location-dependent data in a central data collection point comprising the steps of: collecting location dependent data from a data source, in a nearby portable communications device; transmitting the collected data to a base station of the portable communications device; and communicating the collected data along with a location identifier to the data collection point.

The location identifier may be added to the data by the base station. Alternatively, the location identifier may be included in the data collected from the data source and transmitted to the base station. Alternatively, the location identifier may be supplied by a location-aware component within the portable communications device.

The portable communications device may incorporate a sensor as the data source. Such sensors are referred to herein as "environmental sensor", since they provide information relating to conditions in the immediate locality of the portable communications device. The environmental sensor may provide information representing such conditions as temperature, air pressure, humidity, radiation, air contaminant levels, acoustic noise, magnetic fields, electromagnetic and/or radio signal levels, light levels, pollen count, pheromone levels. The incorporated "environmental sensor" may accordingly detect any one or more of a wide range of conditions in the immediate locality of the portable communications device. The term "environmental data" as used herein is to be interpreted accordingly.

The transmitted data may comprise an identifier identifying the portable communications device, sent with the location identifier. The data may be used to determine the position and speed of motion of the portable communications device. In this case, the portable communications device may be carried in a vehicle, and the collected data may be used to derive location, speed and direction information relating to that vehicle. Similarly, data collected from numerous portable communications devices carried in respective vehicles may be used to derive average speed and direction information relating to traffic in a certain location. The derived speed and direction data may be used to control traffic in the respective location.

An external data source may be used, to wirelessly transmit data to the portable communications device. The external data source may transmit the data by very short range radio transmission. The data transmitted by the very short range radio transmission may comprise information relating to meter readings. The transmitted data may incorporate an identifier identifying the transmitter, which may be used as the location identifier.

The portable communications device may be a mobile telephone.

A location aware component may be a GPS receiver built in to the portable communications device.

The data may be communicated to the data collection point over a telephone network.

The present invention also extends to a portable communications device comprising a power source; an environmental sensor for detecting conditions in the locality of the device, and for providing corresponding data to communications circuitry; and communications circuitry for transmitting the data to a base station.

The present invention also extends to a portable communications device comprising a power source; a receiver for receiving data from an external data source, and for providing corresponding data to communications circuitry; and communications circuitry for transmitting the data to a base station.

Other objects, advantages and novel features of the present invention will become apparent from the following detailed description of the invention when considered in conjunction with the accompanying drawings.

DETAILED DESCRIPTION OF THE DRAWINGS

Figure 1:
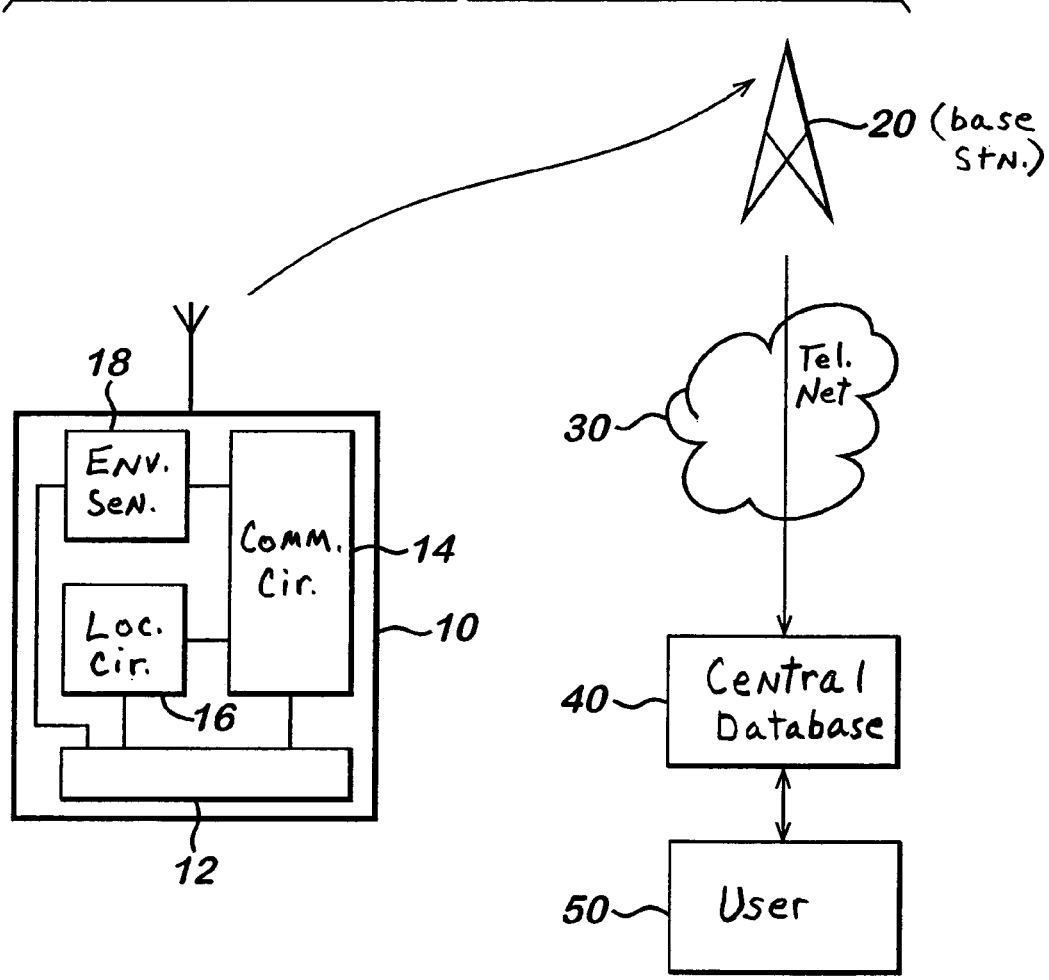
FIGS. 1–4 each schematically represent a respective embodiment of the present invention.

FIG. 1 schematically illustrates a first embodiment of the present invention. A portable communications device 10 (hereinafter referred to as 'mobile phone', although the invention extends to the use of any suitable portable communications device) comprises a power supply 12, communications circuitry 14 and location aware circuitry 16 such as a GPS (global positioning by satellite) receiver or other location aware circuitry operating other systems such as multilateration techniques, inertial navigation, UMTS location standards, or 'Galileo'. The device described thus far is known, the location aware circuitry 16 providing details of the mobile phone's present position to the communication circuitry 14 to enable the mobile phone to request information relevant to the present position of the mobile phone. Such applications known at present include the ability to access street maps of the local area, telephone numbers of nearby hotels and restaurants.

According to certain embodiments of the present invention, the mobile phone 10 also includes an environmental sensor 18, which provides information regarding one or more characteristics of the immediate environment of the mobile phone to the communications circuitry 14. For example, the environmental sensor may detect the local temperature, humidity, air pressure, radiation level, air pollution level levels, acoustic noise, magnetic fields, electromagnetic and/or radio signal levels, light levels, pollen count, or pheromone levels. Such portable communications devices are believed to be novel in themselves.

In operation, the environmental sensor 18 provides environmental data and the location aware circuitry 16 provides location data. This data may be stored in a memory device within the mobile phone. At some time thereafter, the mobile phone transmits signals containing the environmental data and the location data to a base station 20. Data recording the time at which the data was provided by the sensor 18 may also be included.

The mobile phone may transmit its data at regular intervals—perhaps every ten minutes or every hour—or may store the data for transmission next time the mobile phone makes or receives a call. In the first instance, it may not be necessary to add time data to the transmitted environmental and location data; a time field could be added by the base station if necessary. In the second case, it is necessary that a time field is transmitted with the data, since it may be several hours before the mobile phone is next used and the data transmitted to the base station.

Once the transmitted data is received at the base station 20, the environmental, time and location data are transmitted over a telephone network 30 to a central database 40 for access by a user 50.

In this way, it may be possible to obtain a very large set of data relating to environmental conditions over a very wide area. The density of data provided will of course depend on how many suitably enabled mobile phones have passed through the relevant area and transmitted their data in time. For example, this system may enable a weather forecasting service or government statistical office to obtain very accurate measurements of environmental conditions at many separate locations around the country, with a fairly short delay. It is, of course, only possible to employ this embodiment of the invention if mobile phones having the required environmental sensor are in sufficiently widespread use.

The data collected in this way may be corrupted due to particular environmental conditions of the mobile telephones. For example, some may be indoors, some outdoors, some in pockets of clothing. Each of these will affect the environmental data provided by the mobile phone, but suitable software treatment will enable statistical analysis to be performed to extract the required information.

Figure 2:
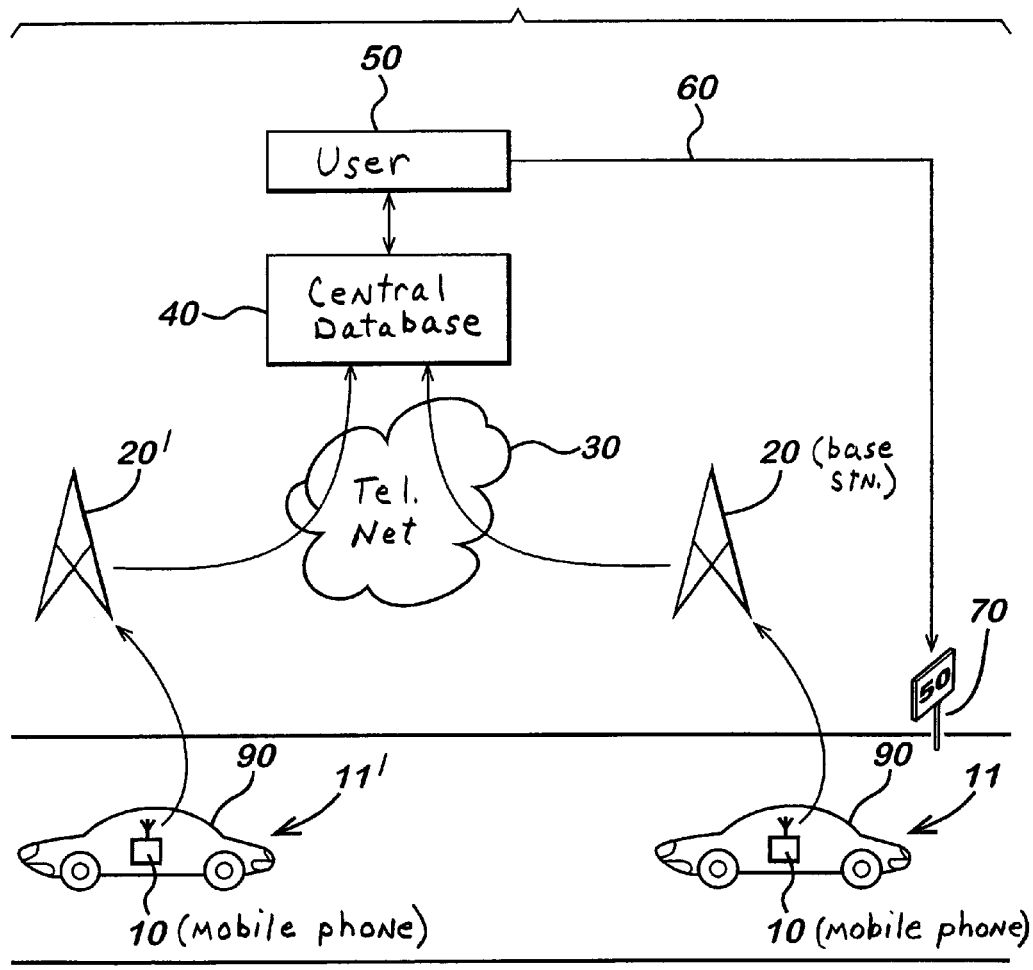

FIG. 2 schematically shows a second embodiment of the present invention. In this embodiment, it is the location of the mobile phone itself that is of interest. For example, a vehicle 90 carries a mobile phone 10 having location aware circuitry 16 in standby mode. Environmental sensor 18 is not necessary in this embodiment. At a certain time, such as at predetermined intervals or when a call is made or received, the mobile phone transmits its location to the base station 20. The location information must be associated with a respective time and identity of the mobile phone. This may be achieved in several ways.

Most simply, the mobile phone transmits its current location to the base station, and the base station adds the time of reception of the data and the identity of the mobile phone, known from the registration process performed when the mobile phone entered the area covered by the base station.

Alternatively, the mobile phone may record its position at regular intervals, say every few minutes, and store the data in its memory. After a relatively lengthy time, say an hour or so, the mobile phone may transmit a list of locations and times to the base station. Again, the identity of the mobile phone may be added by the base station or may be included in the data transmitted from the mobile phone. In another example, corresponding times and locations may be stored in the mobile phone for an indefinite time, and all this data transferred to the base station the next time a call is made or received by the mobile phone. Another alternative is that the mobile phone only transmits its present position when making or receiving a call, although this may well prove to be insufficient data.

Considering the example shown in FIG. 2, the mobile phone 10 records its position 11 and the corresponding time. It may transmit the data immediately to base station 20, or may store the data for later transmission, as discussed above. Some time later, the mobile phone is at position 11'. It records its new position 11' and the corresponding time. As discussed above, it may transmit this data immediately to base station 20', possibly with the stored data relating to former position 11, or may store the data for later transmission. In any case, the time and location data is transmitted at some time to a base station such as 20 or 20'. Base stations 20, 20' may in fact be the same base station. This data is then communicated over a telephone network 30 to a central database 40. The data may then be operated upon to deduce the speed, direction and location of the vehicle at the relevant times. Furthermore, a collection of data sets from numerous vehicles in the same area may be used to build up a picture of traffic density and average speed in the relevant area. In a further development, the calculated speed and density data may be employed to feed back 60 to traffic control devices 70. For example, if traffic is calculated to be particularly dense, automatic signs 70 may be operated to impose a reduced maximum speed limit on the relevant road. If traffic is especially slow, automatic signs 70 may be activated advising drivers to take an alternative route.

Present traffic monitoring systems rely upon sparsely located sites provided with expensive equipment. The present invention would allow effective traffic monitoring across a whole road network with no infrastructure investment required. All that would be necessary would be suitable programming of mobile phones containing location-aware circuitry. It would also require the services of the mobile telephone network providers, and the agreement of mobile telephone users. Users may not wish to have their journey tracked and identifiable to themselves, particularly if that data is to be supplied to a regulatory body such as the police. However, the service provider could easily ensure that data would only be collected and retained as part of a statistical ensemble, and would not be traceable to any particular person.

Figure 3:
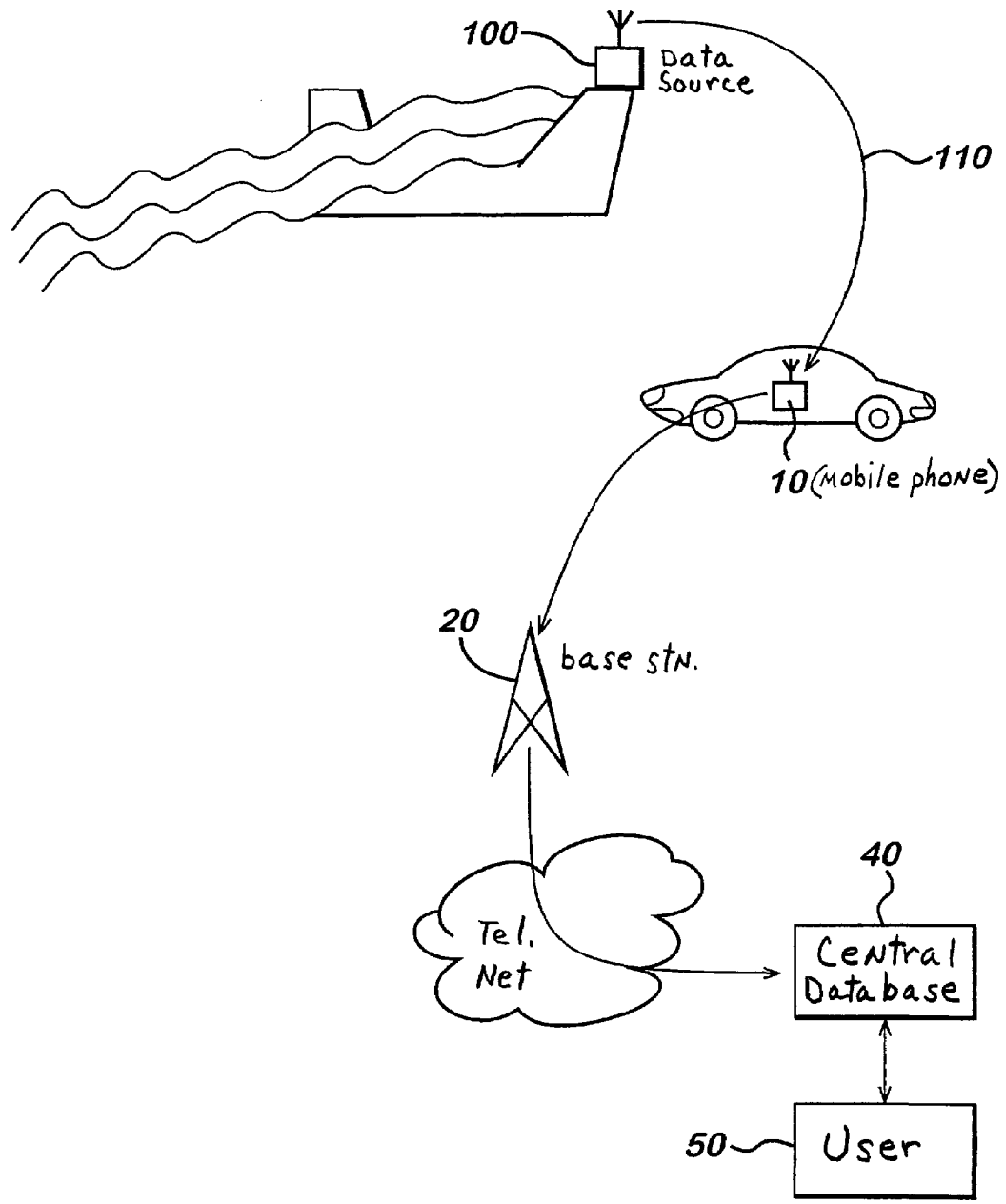
Figure 5:
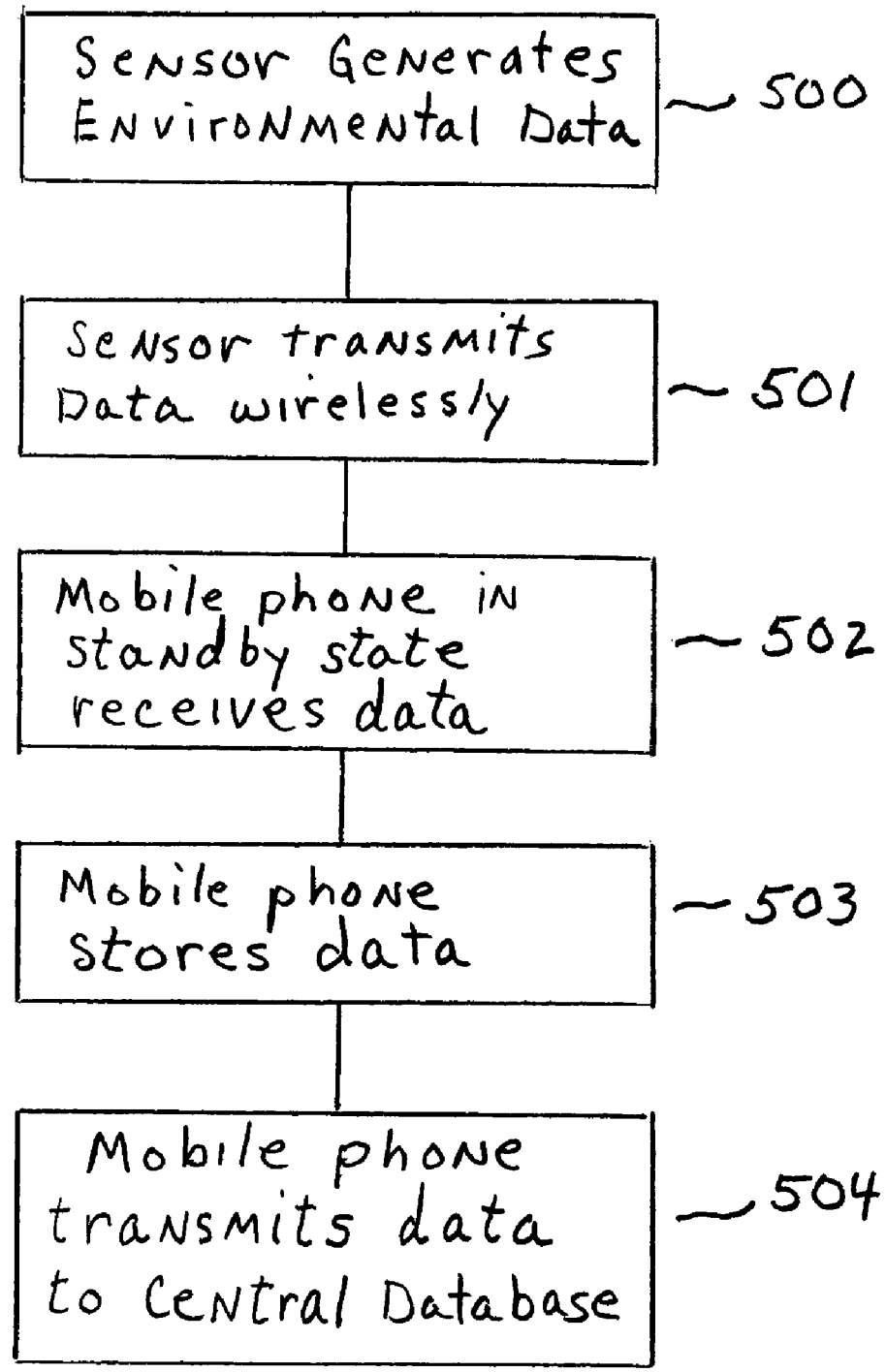
FIG. 5 illustrates the steps of the method according to the invention.

FIGS. 3 and 5 schematically shows a third embodiment of the present invention. In this embodiment a data source 100 provides data (step 500) by wirelessly transmitting 110 (step 501) to any mobile phones 10 in the vicinity (step 502). For example, the data source may transmit data on very short range radio transmission. Any mobile phone 10 which happens to be passing by will receive the transmitted data. This data may be stored (step 503) for later transmission (step 504), as discussed above with respect to first and second embodiments, for example when a call is made or received by the mobile phone 10. Alternatively, the mobile phone may immediately transmit the data. In either case, the data is transmitted to base station 20, and then over a telephone network 30 to a central database 40 for access by a user 50. It will be necessary to identify the data source 100 in some way. For example, this may be by including an identifier in the data transmitted by the data source 100 via the mobile phone 10 to the central database 40, or the mobile phone may add location data (if it has location-aware circuitry) to the received data, and the location data can be used to identify the data source.

As shown in FIG. 3, such an embodiment may be used to obtain readings from remote monitoring stations such as flow meters on rivers or streams. Similarly, this embodiment may be applied to level monitoring in reservoirs, environmental data recorders placed in remote regions or any remote data sources, whose data output does not need to be immediately received.

Figure 4:
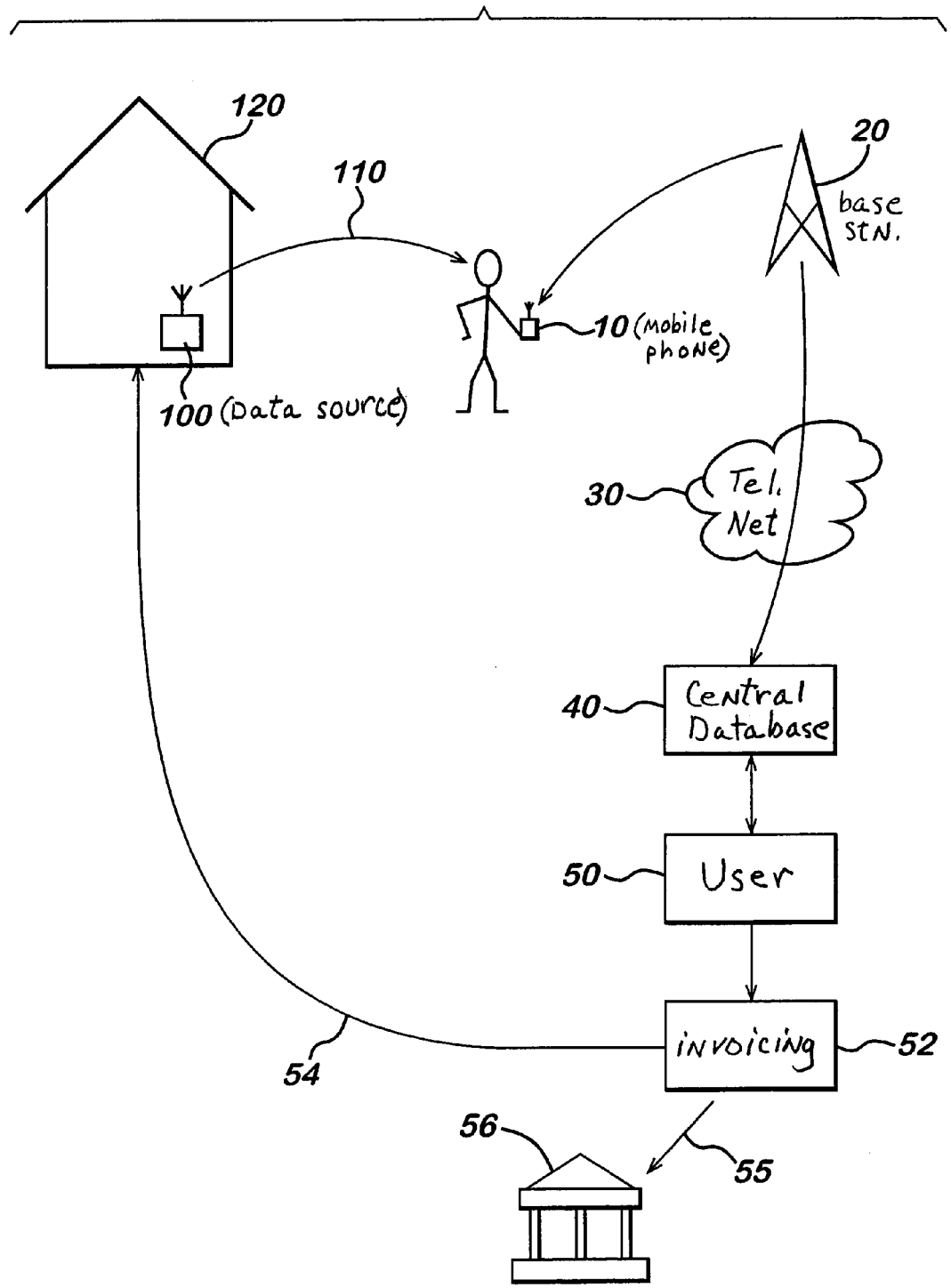

A similar, fourth, embodiment is shown in FIG. 4. In this embodiment, the data source 100 is related to a meter recording the use of services such as gas, water or electricity. Data source 100, similar to that discussed in relation to FIG. 3, is provided at the metered premises 120. When required, perhaps at regular billing intervals such as one month, or several months, the data source 100 wirelessly transmits data concerning the latest meter reading to any mobile phones 10 which may happen to be in the vicinity. This transmission may be by very short range radio transmissions 110. As discussed with reference to the first to third embodiments, this data may be stored in the mobile phone, or may be immediately transmitted.

The data provided by data source 100 must at least contain a meter reading. It may also contain an identifier, such as a customer number or a house number and postcode, to identify the metered premises 120. Alternatively, the mobile phone 10 may add location data, if it is provided with location-aware circuitry 16. The time of data collection may be less relevant in this embodiment, although at least the date of the meter reading should be included in the transmission to the central database 40. The date may be added either by the data source 100, the mobile phone 10 or even the base station 20 in embodiments where transmission to the base station will necessarily take place on the same day as the data was collected from the source 100.

The data is sent via base station 20 and telephone network 30 to a central database 40 for access by a user 50, in this case a utility provider. An automated invoicing operation 52 may be performed, using the information from source 100 to calculate the amount owed to the utility provider by the occupier of premises 120. The invoicing operation may result in a bill being sent 54 to the occupier, for example by post or by electronic mail. Alternatively, the invoicing operation may provoke a direct debit operation 55 with a bank 56, whereby the required sum of money is automatically debited from the occupier's account in favour of the utility provider, while an advice is sent 54 to the occupier.

In respect of the third and fourth embodiments, it may be important to avoid the same data being collected many times. In this case, the mobile telephone service provider may be required to send an instruction to a particular location, for any phones in that area to pick up data from a defined set of equipment. Once the body of data was collected from that area, the instruction could be narrowed down to requesting smaller remnant sets of data.

The central database should preferably be arranged to detect and eliminate multiple occurrences of the same data.

The present invention therefore provides a method of collecting location-dependent data at negligible cost by using mobile phones in standby mode carried by passing users. The invention is particularly applicable to data which does not need to be immediately transmitted to a user, provided that overall coverage is appropriate to the survey required. Indeed, if any particular data needs to be urgently transmitted, the mobile phone may be caused to call the base station immediately and transfer the data. Such calls would, of course, have to be at the expense of the organization requiring the data, rather than the user of the mobile phone.

While the present invention has been particularly described with reference to a limited number of particular embodiments, numerous modifications and amendments may be made to the embodiments of the present invention without departing the scope thereof. For example, while the invention has been particularity described with reference to mobile phones, it is equally applicable to any suitable mobile communications device, provided that a sufficient number are in use to enable the required level of coverage. Similarly, many different applications of location-dependent data can be envisaged, each of which may be collected by the methods and apparatus of the present invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for collecting location-specific data from geographically dispersed remote monitoring stations situated at fixed geographic locations, said method comprising:
   a monitoring station detecting information regarding ambient conditions at a fixed location at which it is situated;
   said monitoring station wirelessly transmitting location-specific data indicative of said information;
   receiving the location-specific data in a mobile telephone which is in a standby mode and is carried by a passing user;
   said mobile telephone transmitting the location-specific data to a base station of the mobile telephone; and
   said base station communicating the location-specific data along with a location identifier to the data collection point.

2. A method according to claim 1 wherein the location identifier is added to the data by the base station.

3. A method according to claim 1 wherein the location identifier is included in the data collected from the data source and transmitted to the base station.

4. A method according to claim 1 in which the location identifier is supplied by a location-aware component within the mobile telephone.

5. A method according to claim 1, wherein:
   the mobile telephone incorporates an environmental sensor as the data source; and
   said sensor provides information relating to environmental conditions in an immediate locality of the mobile telephone.

6. A method according to claim 5 wherein the environmental sensor provides information representing at least one of: temperature, air pressure, humidity, radiation, air contaminant levels, acoustic noise, magnetic fields, electromagnetic and/or radio signal levels, light levels, pollen count, pheromone levels.

7. A method according to claim 2 wherein:
   the transmitted data comprises an identifier identifying the mobile telephone, sent with the location identifier; and the data are used to determine the position and speed of motion of the portable communications device.

8. A method according to claim 7 wherein:
mobile telephone is carried in a vehicle; and
collected data are used to derive location, speed and direction information relating to that vehicle.

9. A method according to claim 8 wherein data collected from numerous mobile telephones carried in respective vehicles is used to derive average speed and direction information relating to traffic in a certain location.

10. A method according to claim 8, wherein the derived speed and direction data are used to control traffic in the respective location.

11. A method according to claim 1, wherein the external data source transmits the data by very short range radio transmission.

12. A method according to claim 11 wherein the data transmitted by the very short range radio transmission comprises information relating to meter readings.

13. A method according to claim 12, in which the transmitted data incorporates an identifier identifying the transmitter, which is used as the location identifier.

14. A method according to claim 4, wherein the location aware component is a GPS receiver built in to the portable communications device.

15. A method according to claim 1, wherein the data are communicated to the data collection point over a telephone network.

16. The method according to claim 1, further comprising storing collected data in a memory of the mobile telephone before transmitting it to the base station.

* * * * *